United States Patent
Karlsson et al.

(10) Patent No.: US 8,162,800 B2
(45) Date of Patent: Apr. 24, 2012

(54) METHOD FOR CONTROLLING DISENGAGEMENT OF AN AUTOMATED CLUTCH IN A VEHICLE

(75) Inventors: Svante Karlsson, Västra Frölunda (SE); Helene Panagopoulos, Göteborg (SE); Erik Lauri, Mölndal (SE)

(73) Assignee: Volvo Lastvagnar AB, Göteborg (SE)

( * ) Notice: Subject to any disclaimer, the term of this patent is extended or adjusted under 35 U.S.C. 154(b) by 962 days.

(21) Appl. No.: 12/159,868

(22) PCT Filed: Jan. 5, 2006

(86) PCT No.: PCT/SE2006/000035
§ 371 (c)(1), (2), (4) Date: Jul. 2, 2008

(87) PCT Pub. No.: WO2007/078225
PCT Pub. Date: Jul. 12, 2007

(65) Prior Publication Data
US 2009/0017989 A1    Jan. 15, 2009

(51) Int. Cl.
*B60W 10/06* (2006.01)
(52) U.S. Cl. ......... 477/175; 477/173
(58) Field of Classification Search ........ 477/166, 477/173, 174, 175, 181
See application file for complete search history.

(56) References Cited

U.S. PATENT DOCUMENTS

| 2,118,978 A * | 5/1938 | Maybach ............ 477/109 |
| 2,204,672 A * | 6/1940 | Folberth et al. ........ 92/11 |
| 7,192,386 B2 * | 3/2007 | Dietzel ............ 477/180 |
| 2002/0084129 A1 | 7/2002 | Fritzer et al. |
| 2005/0020405 A1 * | 1/2005 | Dietzel ............ 477/110 |

FOREIGN PATENT DOCUMENTS

| DE | 4443312 A1 | 6/1995 |
| WO | 02099301 A | 12/2002 |
| WO | 02099301 A1 | 12/2002 |

OTHER PUBLICATIONS

European Search Report for corresponding European App. 06 70 0627.

* cited by examiner

*Primary Examiner* — Ha D. Ho
(74) *Attorney, Agent, or Firm* — WRB-IP LLP

(57) ABSTRACT

A method is provided for controlling disengagement of an automated clutch in a vehicle. A decrease of a first engine rotational speed limit, at which the clutch is disengaged, is initiated upon sensing travel of the vehicle in a down slope, and zero displacement of the throttle control. The first engine rotational speed limit is decreased to a speed where an, in the vehicle arranged, engine idle speed regulator injects an amount of fuel corresponding to a positive engine torque which equals current retarding negative engine torque so that total output torque from the engine is approximately zero. The vehicle accelerating effect due to engine braking torque drop out when the clutch is disengaged will be eliminated.

6 Claims, 2 Drawing Sheets

METHOD FOR CONTROLLING DISENGAGEMENT OF AN AUTOMATED CLUTCH IN A VEHICLE

BACKGROUND AND SUMMARY

The present invention relates, according to an aspect thereof, to a method for controlling an automatic disk clutch, the disk clutch being arranged in a motor vehicle in order to transmit motive force from an internal combustion engine to a transmission.

The invention also relates, according to an aspect, to a computer program for carrying out said method.

Automatic or semiautomatic transmissions of the Automatic Mechanical Transmission (AMT) type have become ever more common in heavier vehicles with the increasing development of microprocessor systems, making it possible, with a control computer and a number of control devices, such as servomotors, for example, to precisely regulate the engine speed, engagement and disengagement of an automatic disk clutch between engine and gearbox, and gearbox clutch members in relation to one another, so that smooth gear changes are always achieved at the correct engine speed.

An AMT usually comprises an input shaft, an intermediate shaft, which has at least one toothed gear meshing with a toothed gear on the input shaft, and main shaft with toothed gears, which mesh with toothed gears on the intermediate shaft. The main shaft is then further connected to an output shaft coupled to the driving wheels via a prop shaft, for example. Each pair of toothed gears has a different gear ratio from another pair of gears in the gearbox. Different transmission ratios are obtained in that different pairs of gears transmit the torque from the engine to the driving wheels.

The development of computer technology has also had an impact on electronic control and feedback systems for a vehicle engine, and these systems have become more precise, faster and more adaptable to prevailing engine and environmental conditions. The entire combustion process can be precisely controlled according to any operating situation. The vehicle's throttle lever (an accelerator pedal, for example), which primarily controls the fuel supply to the engine, controls the vehicle's engine via electrical wiring and electronic signals. The throttle lever is therefore equipped with sensors for detecting the throttle lever position, that is to say what throttle opening is required.

When the driver of a vehicle with automated clutch and transmission drives down a slope without pressing the accelerator pedal and e.g. a low gear engaged (high gear ratio), the speed of the engine will end up near engine idle speed, if the engine provides a certain amount of engine braking power, enough to give at least a slight retardation of the vehicle so that eventually the engine speed will come close to the engine idle speed, which normally will initiate clutch disengagement. If the clutch in this situation is disengaged without or with only a slightly activated service brake, the vehicle will suddenly accelerate due to engine braking power drop out. In this situation, with an only slightly activated service brake, the majority of the braking power comes from the engine, which causes the sudden acceleration when the engine is disconnected from the transmission and driving wheels of the vehicle. The driver will in this situation probably feel discomfort, especially if the disengagement of the clutch is triggered by a light pressing of the brake pedal.

It is desirable to eliminate the possibility for a situation to happen where a sudden vehicle acceleration accrues due to clutch disengagement or even clutch disengagement triggered by a light pressing of the brake pedal.

The method according to an aspect of the invention is a method for controlling disengagement of an automated clutch in a vehicle, where the primary function of the clutch is to transmit motive force from an internal combustion engine arranged in the vehicle to an input shaft of a transmission arranged in the vehicle, and where engine rotational speed is controlled through a throttle control. The method is characterized in that a decrease of a first engine rotational speed limit, at which the clutch is disengaged, is initiated upon sensing that the vehicle is traveling in a down slope and zero displacement of the throttle control.

The advantage of the method according to an aspect of the invention is that the clutch will be disengaged later than normal so that an engine idle speed regulator will be activated, making the engine produce positive output torque, which decreases the effect of the engine braking torque drop out when the clutch will be disengaged. The discomfort of the driver will be decreased.

According to one embodiment of the method according to an aspect of the invention said engine idle speed regulator activation is specified. In this embodiment said first engine rotational speed limit is decreased to an engine speed which is below where an, in the vehicle arranged, engine idle speed regulator is activated and starts to inject fuel into said internal combustion engine. This decreases the uncomfortable effect of the engine braking torque drop out when the clutch is disengaged.

According to another embodiment of the method said first engine rotational speed limit is decreased to a speed where an, in the vehicle arranged, engine idle speed regulator injects an amount of fuel corresponding to a positive engine torque, which equals current retarding negative engine torque, so that total output torque from the engine is approximately zero. The vehicle accelerating effect, due to engine braking torque drop out when the clutch is disengaged, will be totally eliminated.

According to a further embodiment the method according to an aspect of the invention said decrease of a first engine rotational speed limit is initiated upon further sensing of that a service brake pedal in the vehicle is lightly pressed or not pressed at all. This will secure that the driver of the vehicle will not experience a vehicle acceleration when the brake pedal is lightly depressed. According to a further development of this embodiment, said light pressing corresponds to a displacement of up to 25% of a total possible displacement of said service brake pedal.

BRIEF DESCRIPTION OF THE DRAWINGS

The present invention will be described in greater detail below with reference to accompanying drawings which, for the purpose of exemplification, shows further preferred embodiments of the invention and also the technical background.

DETAILED DESCRIPTION

Figure 1:
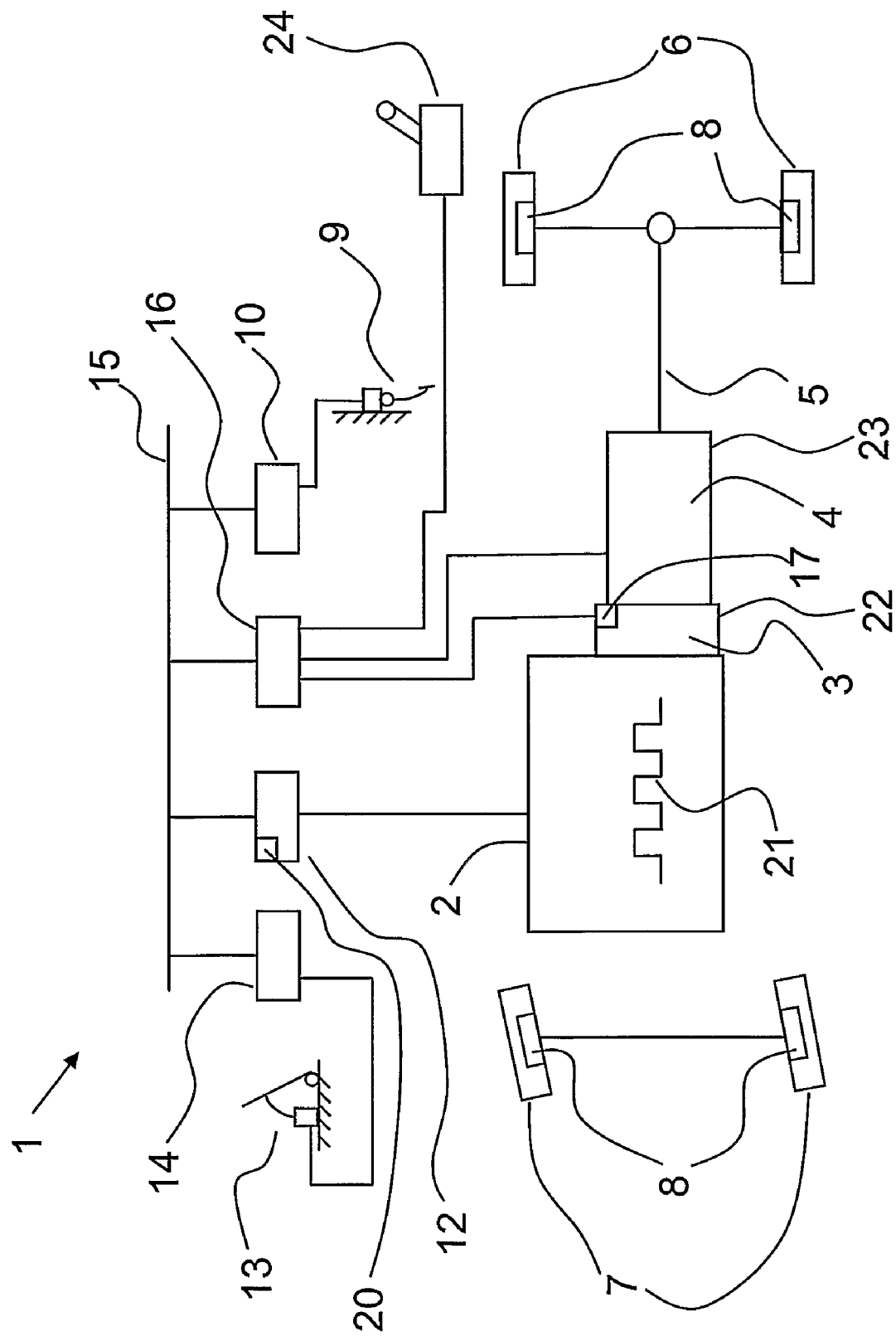
FIG. 1 shows diagrammatically a preferred embodiment of a vehicle configuration according to the invention.

In one embodiment the vehicle 1 is equipped with an internal combustion engine 2, for example a diesel engine, with a crankshaft 21 which is coupled to a disc dry plate clutch 3, which is enclosed in a clutch case 22. The crankshaft 21 is connected, non-rotatably, to an input shaft (not shown), which is rotatably mounted in the housing 23 of a transmission 4. Also rotatably mounted in the transmission housing 23 and not shown are a main shaft and an intermediate shaft.

A transmission control unit 16 is arranged to control different pneumatically operated piston cylinder devices for engaging different gear ratios between the input shaft and output shaft 5 of the transmission according to programmed logic rules. The transmission control unit 16 is also arranged to control the clutch 3 for engagement/disengagement of the engine 2 from the transmission 4, e.g. during gear shifting or vehicle speed below engine idle speed. The output shaft converts to a propulsion shaft and connects the transmission with driven rear wheels 6.

How to decide when to perform a gear shift and to which gear is known art and will not be described in detail in this document. The decision when to disengage the clutch 3 can, according to known art, be based on parameters such as; engine rotational speed, accelerator pedal position, input shaft rotational speed and engine speed retardation.

The engine 2 is equipped with an engine idle speed regulator 20 according to known art, and accordingly there is an engine idle speed, which normally the engine idle speed regulator 20 does not allowed the engine speed to fall below. The engine idle speed regulator 20 is preferably arranged in an engine control unit 12. The engine idle speed regulator can be a program code in the engine control unit 12 designed for performing engine idle speed regulation function. If the transmission control unit 16 senses an engine speed retardation which decreases the engine speed down to near engine idle speed, then the transmission control unit 16 can initiate a clutch disengagement to protect the engine 2 from stopping.

The torque delivered from the engine 2 is controlled by a throttle control 13 (preferably an accelerator pedal) in a known manner. The throttle control position is obtained from an angle sensor and registered by an throttle control unit 14.

The vehicle 1 is also equipped with a service brake system, comprising service brake actuators 8, arranged at not driven front wheels 7 and driven rear wheels 6, service brake control 9 (preferably a brake pedal) and a brake control unit 10. The function of the service brake system is according to known art.

The different control units in the vehicle preferably communicate in a known manner through a data buss system 15 arranged in the vehicle. Thus, the transmission control unit 16 can be arranged to indirectly control the fuel injection, (i.e. the engine speed and torque) depending on the throttle control position, and directly control the air supply to pneumatic piston-cylinder devices of a clutch actuator 17, by means of which e.g. said clutch 3 is regulated.

When a gear selector lever 24 is placed in an automatic gear selection mode, gear selections and shift decisions are made automatically by the transmission control unit 16 based on certain measured and/or calculated parameters such as vehicle speed, engine speed, rate of change of vehicle speed, rate of change of engine speed, throttle control position, rate of change of throttle control position, actuation of a vehicle braking system, currently engaged gear ratio, road inclination and the like are known from prior art. The inclination of the road can be sensed in a known manner, e.g. by a piezoelectric based inclination sensor. This sensor is preferably arranged in the transmission control unit 16.

The transmission control unit 16 in the vehicle 1 is according to one embodiment of the invention programmed to recognize a certain vehicle condition, as described above, by sensing:
vehicle travel in a down slope and;
zero displacement of the throttle control.

When said certain condition is sensed said transmission control unit 16 is according to the invention programmed to decrease a first engine rotational speed limit, at which the clutch 3 according to known art would have been disengaged. Thus, according to the invention, the disengagement of the clutch 3 during said condition will be postponed to a lower engine speed. When the engine speed decreases to a lower speed that is closer to the engine idle speed, said engine idle speed regulator 20 will be activated and starts to inject an amount of fuel into the engine 2 trying to stop further retardation of the engine speed. The injected fuel causes the engine 2 to produce a certain amount of positive engine torque, which counteracts a negative output torque from the engine 2 caused by different losses in the engine due to e.g. friction between different parts of the engine and different auxiliary loads like a generator and an air compressor.

In a preferred embodiment of the invention said transmission control unit 16 is programmed to sense and calculate when said positive output torque (controlled by the engine idle speed regulator 20) from the engine 2 equals negative output torque from the same engine. When said positive and negative engine torques are approximately equal said transmission control unit 16 is programmed to initiate disengagement of the clutch 3. Since net output torque from the engine 2 is zero no change in acceleration/retardation of the vehicle 1 will occur when the engine 2 is disconnected from the transmission 4 and driving wheels 6 of the vehicle.

The positive engine output torque can be calculated by knowing the amount of fuel injected in the engine in a known manner. The negative engine output torque can according to known art be estimated in different ways. Another possibility is to use some kind of torque sensor on the engine output shaft. When the torque sensor measures zero torque then the positive and negative engine torques are equal.

In a preferred embodiment of the invention said first engine rotational speed limit is decreased to a value under engine idle speed. As an example, in a heavy truck, this could mean that the first engine rotational speed limit would be decreased -from e.g. 650 rpm to 600 rpm. The engine speed limit according to this embodiment can be a value prestored in the transmission control unit 16.

In another preferred embodiment of the invention the magnitude of the decrease of said first engine rotational speed limit is determined as a function of at least angle of inclination of said down slope.

In a further preferred embodiment of the invention the magnitude of the decrease of said first engine rotational speed limit is further determined as a function of the retardation of engine speed. In another preferred embodiment of the invention said function to decrease said first engine rotational speed limit is complemented by a condition on the engine torque saying that the driveline is disengaged when the estimated net torque output is above a certain limit.

In one embodiment of the invention said function to decrease said first engine rotational speed limit is initiated only when the service brake pedal 9 in the vehicle is not pressed hard. Said hard pressing could correspond to a displacement of more than 25% of a total possible displacement of said service brake pedal.

The function to decrease said first engine rotational speed limit according to the invention can be used both at high or low gear speed ratios engaged.

Figure 2:
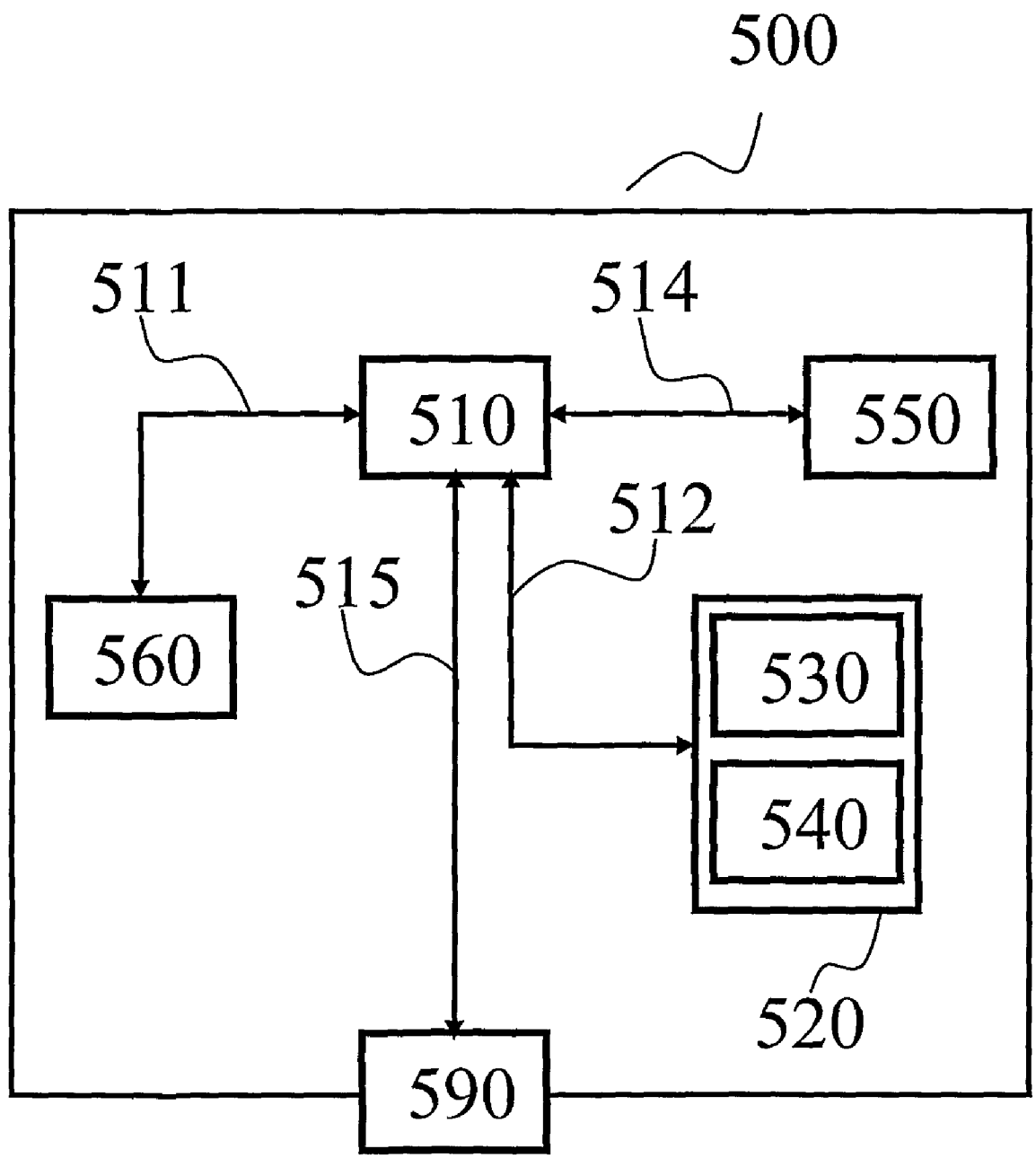
FIG. 2 shows diagrammatically a computer device that is used according to an embodiment of the invention.

FIG. 2 shows an apparatus 500 according to one embodiment of the invention, comprising a nonvolatile memory 520, a processor 510 and a read and write memory 560. The memory 520 has a first memory part 530, in which a computer program for controlling the apparatus 500 is stored. The computer program in the memory part 530 for controlling the apparatus 500 can be an operating system.

The apparatus 500 can be enclosed in, for example, a control unit, such as the transmission control unit 16. The data-processing unit 510 can comprise, for example, a microcomputer.

The memory 520 also has a second memory part 540, in which a program for controlling the clutch disengagement according to the invention is stored. In an alternative embodiment, the program for controlling the clutch disengagement function is stored in a separate nonvolatile data storage medium 550, such as, for example, a CD or an exchangeable semiconductor memory. The program can be stored in an executable form or in a compressed state.

When it is stated below that the data-processing unit 510 runs a specific function, it should be clear that the data-processing unit 510 is running a specific part of the program stored in the memory 540 or a specific part of the program stored in the nonvolatile recording medium 550.

The data-processing unit 510 is tailored for communication with the memory 550 through a data bus 514. The data-processing unit 510 is also tailored for communication with the memory 520 through a data bus 512. In addition, the data-processing unit 510 is tailored for communication with the memory 560 through a data bus 511. The data-processing unit 510 is also tailored for communication with a data port 590 by the use of a data bus 515.

The method according to the present invention can be executed by the data-processing unit 510, by the data-processing unit 510 running the program stored in the memory 540 or the program stored in the nonvolatile recording medium 550.

The invention should not be deemed to be limited to the embodiments described above, but rather a number of further variants and modifications are conceivable within the scope of the following patent claims.

The invention claimed is:

1. A method for controlling disengagement of an automated clutch in a vehicle, where the primary function of the clutch is to transmit motive force from an internal combustion engine arranged in the vehicle to an input shaft of a transmission arranged in the vehicle, and where engine rotational speed is controlled through a throttle control, the method comprising
    initiating a decrease of a first engine rotational speed limit at which speed limit the clutch is disengaged, upon sensing that the vehicle is traveling in a down slope and zero displacement of the throttle control; and
    decreasing the first engine rotational speed limit to a speed where an engine idle speed regulator arranged in the vehicle injects an amount of fuel corresponding to a positive engine torque which equals current retarding negative engine torque so that total output torque from the engine is approximately zero.

2. The method as claimed in claim 1, wherein the decrease of the first engine rotational speed limit is only initiated upon further sensing of that a service brake pedal in the vehicle is lightly pressed or not pressed at all.

3. The method, as in the claim 2, wherein the light pressing corresponds to a displacement of up to 25% of a total possible displacement of the service brake pedal.

4. A computer comprising a program for executing the method as claimed in claim 1.

5. A computer program product comprising a program code, stored on a non-transitory computer-readable medium, for executing the method as claimed in claim 1, when the computer program is executed on the computer.

6. A non-transitory computer program product directly loadable into an internal memory in a computer, which computer program product comprises a computer program for executing the method as claimed in claim 1, when the computer program on the computer program product is executed on the computer.

* * * * *